United States Patent
Kaanugovi et al.

(10) Patent No.: US 12,058,021 B2
(45) Date of Patent: *Aug. 6, 2024

(54) SECURE AND PRIVACY AWARE MONITORING WITH DYNAMIC RESILIENCY FOR DISTRIBUTED SYSTEMS

(71) Applicant: Capital One Services, LLC, McLean, VA (US)

(72) Inventors: Sudheendra Kumar Kaanugovi, Aldie, VA (US); Jimmy Sambuo, McLean, VA (US); Rui Zhang, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,258

(22) Filed: May 4, 2023

(65) Prior Publication Data

US 2023/0275826 A1 Aug. 31, 2023

Related U.S. Application Data

(63) Continuation of application No. 17/364,344, filed on Jun. 30, 2021, now Pat. No. 11,652,721.

(51) Int. Cl.
*H04L 43/50* (2022.01)
*H04L 9/40* (2022.01)
*H04L 43/10* (2022.01)

(52) U.S. Cl.
CPC .............. *H04L 43/10* (2013.01); *H04L 43/50* (2013.01); *H04L 63/0471* (2013.01); *H04L 63/166* (2013.01)

(58) Field of Classification Search
CPC . H04L 43/50; H04L 63/0471; H04L 63/0428; H04L 63/1425; H04L 43/0823
See application file for complete search history.

(56) References Cited

U.S. PATENT DOCUMENTS 7,293,175 B2 * 11/2007 Brown .................. H04L 63/105
713/166
9,213,859 B2 * 12/2015 Strassmann ........... H04L 63/101
(Continued)

OTHER PUBLICATIONS

Wu, Zongda, et al. "Covering the sensitive subjects to protect personal privacy in personalized recommendation." IEEE Transactions on Services Computing 11.3 (2016): 493-506.*
(Continued)

*Primary Examiner* — Jimmy H Tran
(74) *Attorney, Agent, or Firm* — Sterne, Kessler, Goldstein & Fox P.L.L.C.

(57) ABSTRACT

Provided herein are systems and methods for sanitizing logged data packets in a distributed system prior to storing them in a remote or third-party data server. Interactions with an application are monitored and values in a data packet are extracted from the interaction. The values are classified based on a classification configuration and respective labels of the values. The values are then sanitized based on the classification to prevent exposure of secure or private data. The sanitized data packets are then logged into the remote data server. The logged data can be used to help resolve events occurring in the application. The classification configuration can be iteratively updated and the interactions repeated to capture data that was previously sanitized to aid in resolution of events. The logged data can also be used in research or analysis, such as for identifying potential improvements to the application.

20 Claims, 3 Drawing Sheets

(56) References Cited

U.S. PATENT DOCUMENTS

| | | | |
|---|---|---|---|
| 10,079,859 B2 | 9/2018 | Lang et al. | |
| 10,572,684 B2 | 2/2020 | LaFever et al. | |
| 10,628,582 B2 | 4/2020 | Reybok et al. | |
| 10,649,682 B1* | 5/2020 | Chinthekindi | G06F 3/0643 |
| 10,789,387 B2 | 9/2020 | Mutha et al. | |
| 11,036,885 B1* | 6/2021 | Abdelkader | G06F 21/606 |
| 2002/0073313 A1* | 6/2002 | Brown | H04L 63/105 |
| | | | 713/165 |
| 2006/0080554 A1* | 4/2006 | McDonald | G06F 21/6254 |
| | | | 713/189 |
| 2008/0118150 A1* | 5/2008 | Balakrishnan | G06F 21/6254 |
| | | | 382/176 |
| 2008/0172745 A1* | 7/2008 | Reinart | G06F 21/6209 |
| | | | 726/26 |
| 2008/0240425 A1* | 10/2008 | Rosales | G06F 21/6254 |
| | | | 380/28 |
| 2009/0094674 A1* | 4/2009 | Schwartz | H04L 63/302 |
| | | | 709/204 |
| 2009/0254572 A1* | 10/2009 | Redlich | G06Q 10/10 |
| 2010/0042583 A1* | 2/2010 | Gervais | G06Q 40/08 |
| | | | 707/E17.014 |
| 2010/0241687 A1* | 9/2010 | Shein | G06Q 30/0251 |
| | | | 709/203 |
| 2011/0264631 A1* | 10/2011 | Sharma | G06F 21/6254 |
| | | | 707/687 |
| 2012/0030165 A1* | 2/2012 | Guirguis | G06F 21/6254 |
| | | | 707/E17.007 |
| 2012/0041791 A1* | 2/2012 | Gervais | G06F 21/6254 |
| | | | 705/4 |
| 2012/0272329 A1* | 10/2012 | Grammer | G06F 21/6245 |
| | | | 726/26 |
| 2013/0179985 A1* | 7/2013 | Strassmann | H04L 63/0428 |
| | | | 726/26 |
| 2013/0182006 A1* | 7/2013 | Syeda-Mahmood | G06Q 10/10 |
| | | | 345/629 |
| 2013/0182007 A1* | 7/2013 | Syeda-Mahmood | G16H 30/40 |
| | | | 345/629 |
| 2013/0332990 A1* | 12/2013 | Burke | G06F 21/6245 |
| | | | 726/1 |
| 2014/0019985 A1* | 1/2014 | Krajec | G06F 9/4806 |
| | | | 718/102 |
| 2014/0279104 A1* | 9/2014 | Grube | G06Q 20/20 |
| | | | 705/18 |
| 2015/0082416 A1* | 3/2015 | Strassmann | G06F 21/60 |
| | | | 726/28 |
| 2015/0161397 A1* | 6/2015 | Cook | G06F 21/60 |
| | | | 726/26 |
| 2016/0124949 A1* | 5/2016 | Chau | G06F 16/00 |
| | | | 707/665 |
| 2016/0134595 A1* | 5/2016 | Lavinio | H04L 63/0421 |
| | | | 713/168 |
| 2016/0283473 A1* | 9/2016 | Heinze | G06F 16/22 |
| 2016/0300075 A1* | 10/2016 | Stankiewicz | G16H 50/70 |
| 2016/0307063 A1* | 10/2016 | Bright | G06V 30/153 |
| 2016/0321468 A1* | 11/2016 | Stankiewicz | G06F 21/6254 |
| 2017/0061153 A1* | 3/2017 | Gordon | G06F 21/6254 |
| 2017/0357709 A1* | 12/2017 | Tamura | G06F 16/283 |
| 2018/0097810 A1* | 4/2018 | Stolarz | H04W 12/08 |
| 2018/0173889 A1* | 6/2018 | Fink | G06F 21/6254 |
| 2018/0176192 A1* | 6/2018 | Davis | H04L 63/166 |
| 2018/0210817 A1* | 7/2018 | Kelly | G06F 16/252 |
| 2018/0248682 A1* | 8/2018 | Nguyen | H04L 9/002 |
| 2019/0042791 A1* | 2/2019 | Dinov | G06F 17/18 |
| 2019/0050599 A1* | 2/2019 | Canard | H04L 9/0861 |
| 2019/0065780 A1* | 2/2019 | Joisha | G06F 11/0778 |
| 2019/0138749 A1* | 5/2019 | Kim | G06F 21/6254 |
| 2019/0354717 A1* | 11/2019 | Boon | H04L 63/0421 |
| 2019/0354718 A1* | 11/2019 | Chandnani | G06F 21/6254 |
| 2019/0370386 A1* | 12/2019 | Brandwine | G06F 18/241 |
| 2019/0392194 A1* | 12/2019 | Croxford | G06F 18/2431 |
| 2020/0034278 A1* | 1/2020 | Kelly | G06F 16/27 |
| 2020/0153717 A1* | 5/2020 | Nowack | H04L 43/06 |
| 2020/0334381 A1* | 10/2020 | Yarowsky | G06F 40/166 |
| 2020/0394333 A1* | 12/2020 | Norgeot | G06F 40/284 |
| 2020/0410116 A1* | 12/2020 | Williamson | G06F 21/6254 |
| 2021/0035342 A1 | 2/2021 | Glaser et al. | |
| 2021/0084057 A1 | 3/2021 | Chhabra | |
| 2021/0089669 A1* | 3/2021 | Guirguis | G16H 10/60 |
| 2021/0133350 A1* | 5/2021 | Kirti | G06F 21/6245 |
| 2021/0141929 A1* | 5/2021 | Hydro | G06F 16/25 |
| 2021/0149934 A1* | 5/2021 | Yeh | G06F 16/335 |
| 2021/0194685 A1* | 6/2021 | Patel | H04L 9/0866 |
| 2021/0209249 A1* | 7/2021 | Hoffer | G16H 50/20 |
| 2021/0240853 A1* | 8/2021 | Carlson | G16H 10/20 |
| 2021/0248268 A1* | 8/2021 | Ardhanari | G16H 70/60 |
| 2021/0334261 A1* | 10/2021 | Gkoulalas-Divanis | G06N 20/00 |
| 2021/0350264 A1* | 11/2021 | Cheng | G06N 7/01 |
| 2021/0383007 A1* | 12/2021 | Mardini | G06F 21/6254 |
| 2021/0398109 A1* | 12/2021 | Huber, Jr. | G06N 3/04 |
| 2021/0398128 A1* | 12/2021 | Huber, Jr. | G06Q 20/4016 |
| 2022/0019687 A1* | 1/2022 | Poutra | G06F 21/6245 |
| 2022/0019868 A1* | 1/2022 | Klein | G06F 18/214 |
| 2022/0050921 A1* | 2/2022 | LaFever | H04L 63/20 |
| 2022/0156369 A1* | 5/2022 | Narayanaswamy | H04L 9/0872 |
| | | | 713/168 |
| 2022/0222373 A1* | 7/2022 | Villax | H04W 12/02 |
| 2022/0253545 A1* | 8/2022 | Sloane | G06F 21/6245 |
| 2022/0366078 A1* | 11/2022 | Kirti | G06N 5/022 |
| 2023/0006908 A1 | 1/2023 | Kaanugovi et al. | |

OTHER PUBLICATIONS

Garfinkel, Simson. De-identification of Personal Information:. US Department of Commerce, National Institute of Standards and Technology, 2015.*

Covering the Sensitive Subjects to Protect Personal Privacy in Personalized Recommendation (Year: 2018).*

De Identification of Personal Information (Year: 2015).*

* cited by examiner

SECURE AND PRIVACY AWARE MONITORING WITH DYNAMIC RESILIENCY FOR DISTRIBUTED SYSTEMS

BACKGROUND

Applications that allow users to access services or perform tasks on devices increasingly rely on distributed systems. Information from user interactions with or events occurring in these applications are logged for various reasons, such as troubleshooting, archiving, research, or analysis. Due to the distributed nature of the systems, the logged information is stored in remote data storage provided by the application provider or a third party. When the logged information is transmitted to the remote data storage, sensitive information is exposed both by the transmission of the logged information and by the storage on the server. The exposure can represent unacceptable security and privacy risks to users.

BRIEF SUMMARY

Disclosed herein are systems, methods and computer program products for dynamically sanitizing logged information from application interactions and events.

In an embodiment, methods or systems monitor interactions or events occurring in an application. A data packet containing labeled values is extracted from the interaction or event. A sanitization system classifies each value with a sensitivity based on the label and a classification configuration and then sanitizes the values in the data packet based on their classified sensitivity. The classification configuration is available at initialization of the application. The sanitized data packet is then logged into a data repository, such as a data server.

In an embodiment, the interaction can be monitored for errors that occur. A help service can attempt to determine a cause of the error based on the sanitized data packet stored in the data repository. If the help service fails to determine the cause, the help service can modify the classification configuration. The help service then instructs the user to operate the application to cause the interaction or the event to occur again in the application. The interaction is monitored and a data packet is extracted. The sanitization system classifies at least one value to a different sensitivity, sanitizes the values, and logs them into the data repository. The help service iteratively updates the classification configuration until a cause is identified. Once a cause is identified, the help service aids a user in resolving the error. The classification configuration can then be reset and logged data packets created due to the help service can be deleted.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for dynamically sanitizing logged information from application interactions and events.

Applications running on distributed systems generate information based on user interactions or events occurring within the application. User interactions include users logging in to the application, inputting or accessing information, and making use of tools or utilities provided by the application, such as making a purchase or transferring money. Events occurring in the application include displaying features or running other application programming interfaces (APIs) in the application. Logging systems log data from the user interactions and events for various uses, such as trouble-shooting, research, or analysis of application performance.

As part of running an application on a distributed system, the logged data is often stored in a data server or data storage that is remote to the device running the application. The proliferation of cloud networking and storage solutions sometimes means that the logged data is stored on a third-party server. Both the transmission of the logged data through the distributed system and the storage of the data on the third-party server can expose sensitive information in the logged data, such as social security numbers, credit card numbers, or device identifiers.

In order to protect the sensitive information, a sanitization system is used to remove, obfuscate, or encrypt the logged data. In some embodiments, this requires a policy or configuration that describes what to sanitize and how to do so. Due to differences between applications, formatting of the logged information can vary. What constitutes sensitive data and how it is retained or described can change as well. As a result, the logging system downloads a specific configuration in order to log information from a given application.

When initializing an application, the specific configuration may not be available for sanitizing logged information. The configuration can be unavailable due to connection issues or an application not having a specified configuration. As a result, the logging system may not be able to sanitize the logged data. What is needed is a default configuration that can be used for sanitization for a variety of applications. The default configuration can be supplemented with a dynamic system for updating the default configuration to address new applications, changes in what data to sanitize, and updates to how to sanitize the logged data. In some embodiments, the dynamic updating of the configuration allows a troubleshooter to duplicate interactions or events under different sanitization protocols, allowing the troubleshooter access to sensitive information that can be used in resolving an issue or error.

Figure 1:
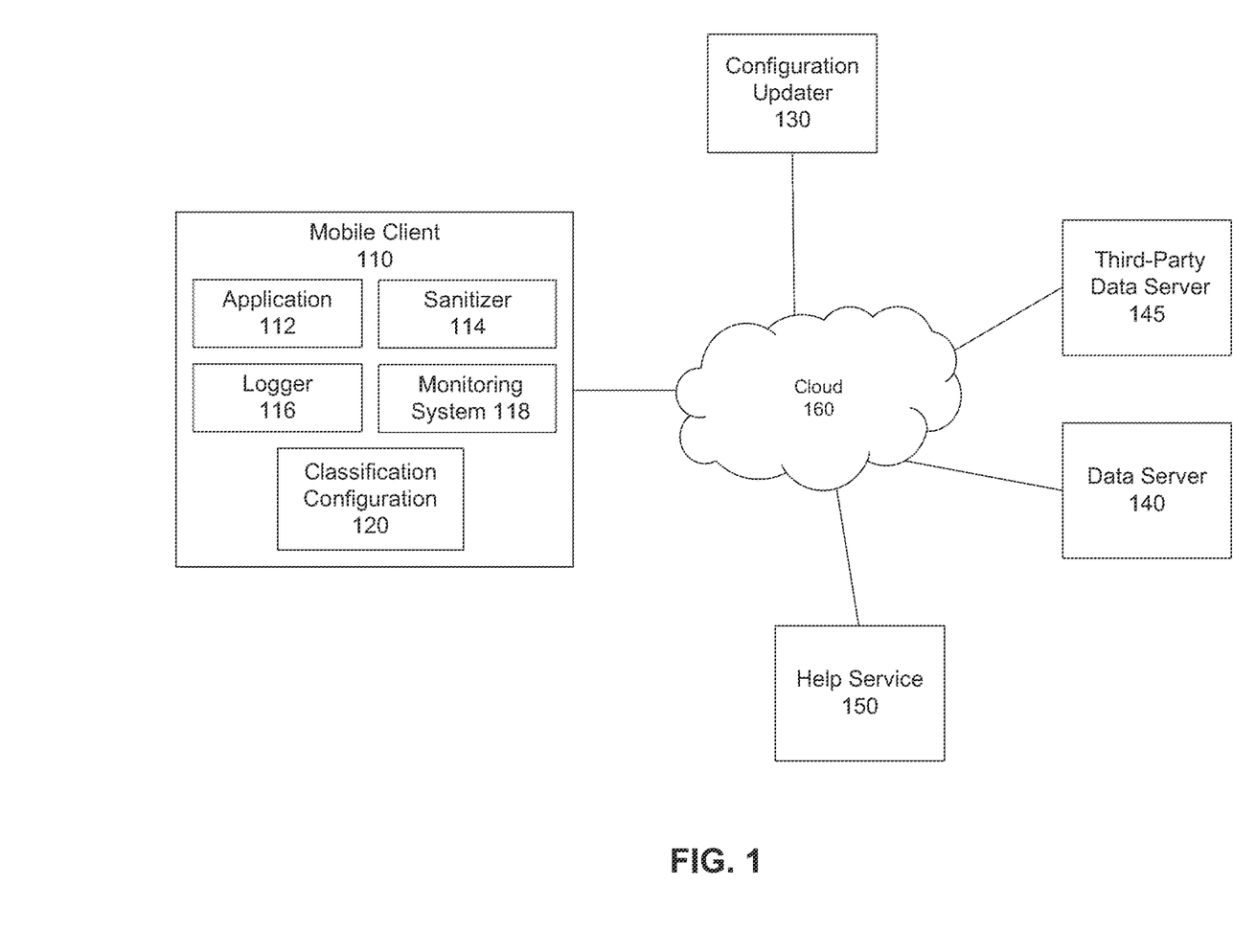
FIG. 1 illustrates a block diagram of a sanitization system for logged information from application interactions, according to some embodiments.

FIG. 1 illustrates a block diagram of a sanitization system 100 for logged information from application interactions, according to some embodiments. A mobile client 110 has monitoring system 118 for monitoring interactions between a user and application 112 and events occurring in application 112. Logger 116 logs information from the user interactions and events. The logged information is transmitted via cloud 160 to a data server 140 or third-party data server 145 for storage. Mobile client 110 has a sanitizer 114 for sanitizing the logged information prior to transmission. Sanitizer 114 sanitizes the data based on classification configuration 120. In some embodiments, classification configuration 120 is a default configuration that ships with or is otherwise part of sanitizer 114 or mobile client 110. In some embodiments, the default configuration is available to mobile client 110 or sanitizer 114 when application 112 is initialized. In some embodiments, classification configuration 120 is an updated or modified version of the default configuration. For example, configuration updater 130 updates classification configuration 120. In some embodiments, a user of mobile client 110 interacts with help service 150 to resolve issues in using application 112.

Mobile client 110 is a device or system configured to run application 112. As non-limiting examples, mobile client 110 is a laptop, a smart phone, a tablet, a thin client, or a distributed computer interface system. In some embodiments, mobile client 110 is a computer system, such as computer system 300 described below in FIG. 3. A user accesses application 112 via mobile client 110. Application 112 allows a user to access information or services through the internet. As non-limiting examples, application 112 is an online shopping application, a mobile banking application, or other applications that handle sensitive user or mobile client 110 information.

Mobile client 110 is configured to run monitoring system 118, which monitors interactions between the user and application 112 and events occurring in application 112. In some embodiments, monitoring system 118 monitors more than one application 112 on mobile client 110. Monitoring system 118 extracts information about the interaction(s) and event(s). In some embodiments, monitoring system 118 extracts the information as one or more values and forms it into a data packet. In some embodiments, monitoring system 118 extracts the information as a data packet from the interaction or event.

As a non-limiting example, an interaction is a user logging in to an online banking system. The user forgets the password and recovers the password using a social security number. The application receives inputs of the social security number, a new password, and a username. As part of the interaction, application 112 uses an identifier and an internet protocol (IP) address of mobile client 110. Monitoring system 118 extracts the values for the social security number, the identifier of the mobile client 110, and the IP address. In some embodiments, monitoring system 118 labels the extracted information. In some embodiments, monitoring system 118 the extracted information is extracted with labels.

As another non-limiting example, the user instructs application 112 to display user account information and provides credentials or login information, and an API accesses the user account information and generates the display. The event is the API accessing and generating the display. The user account information includes sensitive information about the user's account, and the information that is accessed and displayed is extracted by monitoring system 118.

Mobile client 110 runs sanitizer 114, which sanitizes the extracted information based on classification configuration 120. In some embodiments, classification configuration 120 is a default configuration that is shipped with mobile client 110 or sanitizer 114. Sanitizer 114 classifies each value in the extracted information to a sensitivity level and then sanitizes the extracted information based on the sensitivity level.

Classification configuration 120 has rules for identifying or classifying sensitive information. The labels of the extracted information are checked against the rules. When the label satisfies the rule, the label and corresponding value in the extracted information are assigned a sensitivity level that corresponds to the rule. In some embodiments, extracted information can be high sensitivity, medium sensitivity, low sensitivity, or not sensitive.

As an example, the rule is that social security numbers are classified as high sensitivity. When a social security number is found in the extracted information, that value is assigned high sensitivity. In some embodiments, the rule is a regular expression configured to match a label for sensitive information. In some embodiments, classification configuration includes more than one rule for classifying the sensitivity level of values. For example, the label for a social security number can be the words "social security number" or the letters "SSN," and rules have regular expressions for matching those different words.

Sanitizer 114 sanitizes the extracted information based on the sensitivity levels and according to the classification configuration 120. In some embodiments, sanitization includes performing one or more of pruning values, redacting values, or encrypting values. In some embodiments, pruning involves removing or deleting a value from the extracted information. In some embodiments, redacting values involves replacing the value with different information that is not based on the original value. In some embodiments, redacting a value replaces the value with a coded number that is based on the label for the value, but not on the value itself. In some embodiments, encrypting values involves encoding the values based on an encryption scheme. For example, public/private key encryption or other asymmetric encryption approaches are used to encode values. In some embodiments, the label for a value is not sanitized and left in the extracted information to identify that such a value was present. In some embodiments, the label for a value is sanitized in addition to the value.

In some embodiments, different types of sanitization are assigned to different sensitivity levels based on classification configuration 120. For example, high sensitivity is assigned to pruning, medium sensitivity is assigned to redacting, and low sensitivity is assigned to encrypting. In some embodiments, sanitizer 114 is configured to first prune the extracted information, then redact the extracted information, then encrypt the extracted information.

In some embodiments, different encryption techniques are applied to sanitize logged data in the same sensitivity level. The different encryption techniques can vary to provide different levels of security and encryption processing time. For example, the encryption techniques can vary by encryption key length, algorithm, or use of symmetric or asymmetric keys. In some embodiments, where there is more low sensitivity logged data than medium or high sensitivity logged data, the low sensitivity logged data can be sanitized to balance time taken for encryption with degree of security.

In some embodiments, the low sensitivity logged data can be assigned an encryption technique based on the size or length of the value. In some embodiments, classification configuration 120 assigns a specific encryption technique based on an amount of low sensitivity logged data that is to be encrypted. For example, the specific encryption technique is selected to ensure that the low sensitivity logged data can be sanitized within a certain time period. As another example, the specific encryption technique is selected based on a combination of time to sanitize the logged data and a minimum level of security. When there is less logged data to sanitize, an encryption technique with a higher level of security is used to better protect the data. When there is more logged data to sanitize, an encryption technique with a lower level of security, but not less than a minimum level, is selected to safely encrypt the data without slowing down processing or performance of application 112 and mobile client 110.

Mobile client 110 runs logger 116, which logs the sanitized information to remote data storage, such as data server 140 or third-party data server 145. Data server 140 is a server or data storage, such as cloud-based storage, that is maintained by a business or entity that controls or owns monitoring system 118. Third-party data server 145 is a server or data storage, such as cloud-based storage, that is maintained or controlled by a third party. In some embodiments, sanitizing the extracted information prior to logging it increases security and privacy for transmission of the extracted information to the remote data storage. In some embodiments, sanitizing the extracted information prior to logging it increases security and privacy for the storage of the extracted information.

Classification configuration 120 contains rules and policies for classifying and sanitizing extracted information. In some embodiments, mobile client 110 or a system for sanitizing information prior to logging it on mobile client 110 has a default classification configuration. For example, mobile client 110 or sanitizer 114 ships with a default classification configuration, such as classification configuration 120.

In some embodiments, sanitizer 114 attempts to update classification configuration 120 prior to using it or at regular intervals. For example, upon initialization of mobile client 110, sanitizer 114 attempts to update classification configuration 120 from the default configuration to ensure that the most up-to-date sensitivity settings are available. Sanitizer 114 accesses configuration updater 130 through cloud 160. In the event that sanitizer 114 is unable to access configuration updater 130, the default classification configuration or a current classification configuration is used. In some embodiments, this allows sanitizer 114 to sanitize data without first downloading or accessing a remote classification configuration.

In some embodiments, sanitizer 114 is able to contact classification updater 130 and determine whether an update to classification configuration 120 is available or necessary. If an update is available or necessary, configuration updater 130 sends the update to classification configuration 120. Updates to classification configuration 120 can include adding new rules, changing assigned sensitivity levels for rules, and/or changing which sanitization type is assigned to a sensitivity level (such as changing pruning to redacting).

Errors can occur during interactions, such as a failure of application 112 or the interaction itself, a network disconnection or error, or other types of issues that prevent a user from correctly completing the interaction. In some embodiments, these errors are logged as events. In some embodiments, events or interactions occur in application 112 that are related to or the cause of these errors. In some embodiments, monitoring system 118 or help service 150 monitor the interactions and events and detect when errors occur. In some embodiments, the user contacts help service 150 after experiencing an event for assistance.

Help service 150 is a user-based or computer-based (for example, computer system 300, described below in FIG. 3) help system that is available to assist users of application 112 when errors occur. For example, if the user attempts to transfer money from their bank account, an error can occur and cause the transfer to fail. The user can contact help service 150 to attempt to resolve the error. Help service 150 accesses the logged information for the interaction and attempts to determine what caused the error. In some embodiments, help service 150 then resolves the error or otherwise assists the user in resolving the error.

In some embodiments, the logged data is insufficient to help resolve the error. As an example, if a device identifier and an IP address for mobile client 110 are necessary to resolve the issue, but those values are considered secure or private, they are sanitized and purged or redacted from the logged data and help service 150 cannot access them from the logged data. Help service 150 instructs configuration updater 130 to update the classification configuration 120 to classify the data to a lower sensitivity level and correspondingly only encrypt the device identifier and IP address. Help service 150 then requests the user to operate the application to cause the interaction or event, such as the attempt to transfer money, to occur in the application again, but with an updated classification configuration. The logged information from the new attempt will contain the values in an encrypted form, allowing help service 150 to access and decrypt the values and better resolve the error.

In some embodiments, help service 150 deletes the logged information from the updated interaction attempt after resolving the error. In some embodiments, help service 150 updates classification configuration back to its previous configuration after resolving the issue. In some embodiments, help service 150 repeats the updating of classification configuration 120 and having the user repeat the interaction iteratively to slowly reduce the sensitivity of additional information to help resolve the error. In some embodiments, help service 150 is able to reduce exposure of sensitive and private information by only temporarily exposing the data and while keeping the data encrypted.

In some embodiments, the logged data is accessed for research or analysis purposes. For example, the logged data can indicate trends for use of application 112 or common events. As another example, the logged data can be used to identify improvements to make to application 112.

Cloud 160 is a network, a cloud system, or other distributed computing system that allows devices and systems to communicate, such as via a wireless network or the internet.

Figure 2:
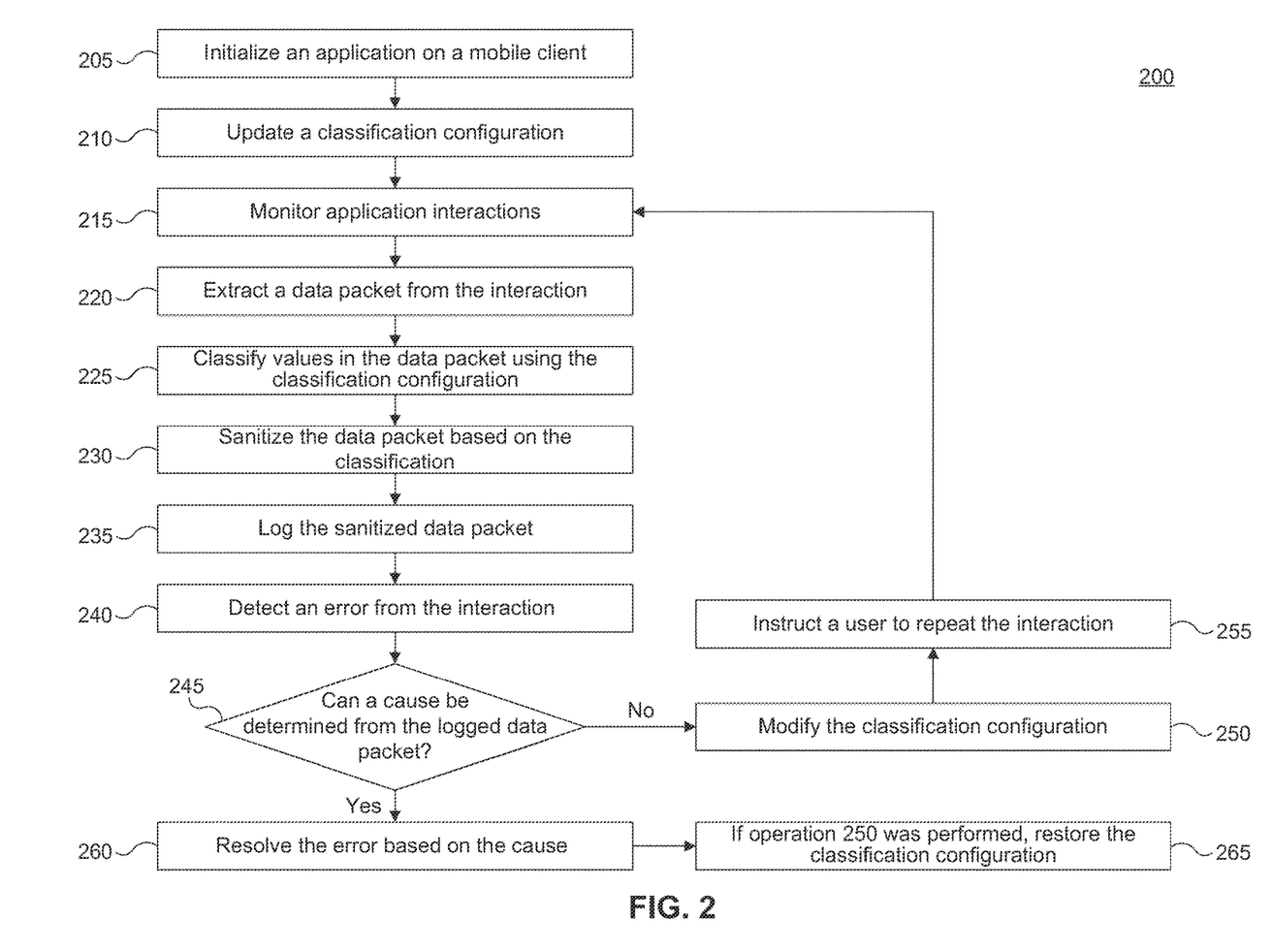
FIG. 2 is a flowchart illustrating a method for providing dynamic sanitization of logged information from application interactions, according to some embodiments.

FIG. 2 is a flowchart illustrating a method 200 for providing dynamic sanitization of logged information from application interactions, according to some embodiments. In some embodiments, method 200 also provides dynamic sanitization of logged information from application events. In some embodiments, method 200 is performed by sanitization system 100.

In 205, a user initializes application 112 on mobile client 110. In some embodiments, initializing includes installing application 112. In some embodiments, initializing includes opening or launching application 112.

In 210, mobile client 110 updates classification configuration 120. Mobile client 110 or sanitizer 114 has a default classification configuration 120 that is available upon initialization for logging. In some embodiments, sanitizer 114 updates classification configuration 120. In some embodiments, sanitizer 114 or monitoring system 118 include a default version of classification configuration 120.

In some embodiments, classification configuration 120 is updated by checking if an update to classification configuration 120 is available in configuration updater 130. When an update is available and configuration updater 130 can be contacted through cloud 160, the update is applied to classification configuration 120. If no update is available, or if configuration updater 130 is unable to be contacted, the default version or current version (if classification configuration has been previously updated) of classification configuration 120 is selected for use.

In some embodiments, operation 210 is performed at regular intervals to identify and download updates to classification configuration 120 as they become available. For example, an update to classification configuration 120 may include sanitization rules or settings for a new application, changes for existing applications, or definitions for new types of sensitive data or sanitization techniques, such as different encryption techniques.

In 215, monitoring system 118 monitors interactions between the user and application 112. In some embodiments, interactions include when a user attempts to take an action, such as logging in, accessing data, sending data, entering an input into application 112, or otherwise using application 112. In some embodiments, monitoring system 118 monitors events occurring in application 112.

In 220, monitoring system 118 extracts a data packet from the interaction. In some embodiments, the data packet has values with labels that describe the values. In some embodiments, monitoring system 118 extracts a data packet from events.

In some embodiments, application 112 creates the data packet as part of the interaction or event and monitoring system 118 extracts the data packet. For example, application 112 is configured to packetize values that are part of the information into the data packet. In some embodiments, monitoring system 118 extracts values from the interaction or event. For example, the interaction or event involves data values, such as a social security number, device identifier, or IP address, and monitoring system 118 extracts desired values from the interaction or event, or from application 112 or mobile client 110 during the interaction or event. Once monitoring system 118 has extracted the values, monitoring system 118 combines the extracted values into a data packet.

In some embodiments, the values in the extracted data packet or the extracted values have corresponding labels. In some embodiments, monitoring system 118 identifies and labels the values.

In 225, sanitizer 114 classifies the values in the data packet using classification configuration 120. Each value in the data packet is assigned a respective sensitivity based on the label for that value and classification configuration 120. In some embodiments, the respective sensitivities are high sensitivity, medium sensitivity, low sensitivity, and not sensitive. In some embodiments, classification configuration 120 has one or more rules with corresponding sensitivities and sanitizer 114 assigns the corresponding sensitivity to a value with a label that satisfies the rule. In some embodiments, if a label satisfies none of the rules, the value is classified as not sensitive.

In some embodiments, classification configuration 120 has rules that are regular expressions with respective sensitivity levels. Sanitizer 114 classifies the values by comparing the labels to the regular expressions and assigns the sensitivity to a value with a label that satisfies the regular expression.

In 230, sanitizer 114 sanitizes the data packet based on the classification. Sanitizer 114 applies a sanitization process for each value based on the classified sensitivity of the value. In some embodiments, the sanitization processes include pruning, redacting, and encrypting.

In some embodiments, sanitizer 114 prunes by removing or deleting a value from the data packet. In some embodiments, sanitizer 114 redacts values by replacing the value with different information that is not based on the original value. In some embodiments, sanitizer 114 redacts a value and replaces the value with a coded number that is based on the label for the value, but not on the value itself. In some embodiments, sanitizer 114 encrypts values by encoding the values based on an encryption scheme. For example, public/private key encryption or asymmetric encryption are used to encode values. In some embodiments, sanitizer 114 sanitizes the value, but not the label for the value. In some embodiments, sanitizer 114 sanitizes the value and its corresponding label.

Classification configuration 120 identifies which sanitization process to apply based on the classified sensitivity. For example, high sensitivity is assigned to pruning, medium sensitivity is assigned to redacting, and low sensitivity is assigned to encrypting. In some embodiments, sanitizer 114 is configured to first prune the extracted information, then redact the extracted information, then encrypt the extracted information. Sanitizer 114 sanitizes the values based on the classified sensitivities.

In some embodiments, more than one encryption technique is defined or available in classification configuration 120. Sanitizer 114 selects an encryption technique based on a required level of security and an encryption processing time based on rules or requirements in classification configuration 120. For example, the encryption technique is selected to ensure that the low sensitivity logged data can be sanitized within a certain time period. As another example, the specific encryption technique is selected based on a combination of time to sanitize the logged data and a minimum level of security. When there is less logged data to sanitize, an encryption technique with a higher level of security is used to better protect the data. When there is more logged data to sanitize, an encryption technique with a lower level of security, but not less than a minimum level, is selected to safely encrypt the data without slowing down processing or performance of application 112 and mobile client 110.

In 235, logger 116 logs the sanitized data packet. Logger 116 sends the sanitized data packet through cloud 160 to a data repository, such as data server 140 or third-party data server 145. Data server 140 or third-party data server 145 receive and store the sanitized data packet.

In 240, help service 150 or monitoring system 118 detect an error from the interaction. In some embodiments, help service 150 or monitoring system 118 monitor the interactions and errors occurring during the interaction. In some embodiments, monitoring system 118 monitors events occurring in application 112 and errors occurring during the events. When an error occurs and is detected, monitoring system 118 contacts help service 150. Help service 150 can contact the user or be contacted by the user to assist with resolving an issue resulting from the event, such as a failure to complete the interaction.

In 245, help service 150 attempts to determine a cause of the error based on the logged data packet for the interaction. In some embodiments, help service 150 attempts to determine a cause of the error based on the logged data packet for the event. Help service 150 accesses the logged data packet from data server 140 or third-party data server 145 and analyzes the values. Help service 150 decrypts encrypted values. In some embodiments, help service 150 is able to identify a cause for the error based on the values in the data packet. In some embodiments, the user provides help service 150 with additional information that allows help service 150 to identify the cause and resolve the error. In some embodiments, help service 150 is unable to identify the cause based on the available values in the logged data packet.

When help service 150 is able to identify the cause, method 200 proceeds to operation 260. When help service 150 is unable to identify the cause, method 200 proceeds to operation 250.

In 250, help service 150 modifies classification configuration 120. Help service 150 can add rules, modify rules, or remove rules. In some embodiments, help service 150 modifies a rule to change the respective sensitivity level for that rule, such as by lowering the sensitivity level for the rule. For example, the sensitivity level for sensitive information can be lowered to a level that only encrypts the values for logging, rather than pruning or redacting the value.

In some embodiments, help service 150 modifies classification configuration 120 using configuration updater 130. In some embodiments, help service 150 modifies classification configuration 120 directly.

In 255, help service 150 instructs the user to repeat the interaction. In some embodiments, help service 150 instructs the user to repeat steps that cause an event or interaction. In some embodiments, help service 150 causes application 112 to perform the event. In some embodiments, help service 150 instructs the user to operate the application to cause the interaction or event to occur again in the application. For example, if the user was attempting to transfer money, help service 150 instructs the user to repeat the attempt to transfer money. In some embodiments, help service 150 instructs the user to repeat only some of the steps of the interaction.

Method 200 then proceeds to operation 215. The interaction or event is repeated with the updated classification of operation 250, which increases the amount of information available to help service 150 for identifying the cause of the error.

In some embodiments, help service 150 modifies classification configuration 120 in operation 250 and instructs the user to repeat steps of the interaction or to cause an event in operation 255 to log values that will aid in resolving the error. For example, help service 150 can lower the sensitivity of IP address information to aid in identifying causes of a connectivity issue. In some embodiments, this allows help service 150 to avoid exposing other sensitive information that is not helpful in identifying the cause of the error.

In some embodiments, method 200 proceeds iteratively through operations 215 to 245 and returns to operations 250 and 255 to expose additional sensitive information in a systematic manner while attempting to identify the cause of the error. In this way, method 200 minimizes the amount of sensitive information that is exposed to the logging process.

In 260, help service 150 resolves the error based on the cause. For example, if mobile client 110 has a device identifier that is not authorized to perform the attempted interaction, help service 150 can instruct the user to repeat the interaction on a different, authorized device. In some embodiments, help service 150 deletes from data server 240 and third-party data server 245 any additional logged data packets created by proceeding through operations 250 and 255.

In 265, help service 150 restores classification configuration 120. Operation 265 is optional and is for resetting changes to classification configuration 120 that occurred as part of operation 250. Help service 150 restores classification configuration 120 directly or using configuration updater 130.

Figure 3:
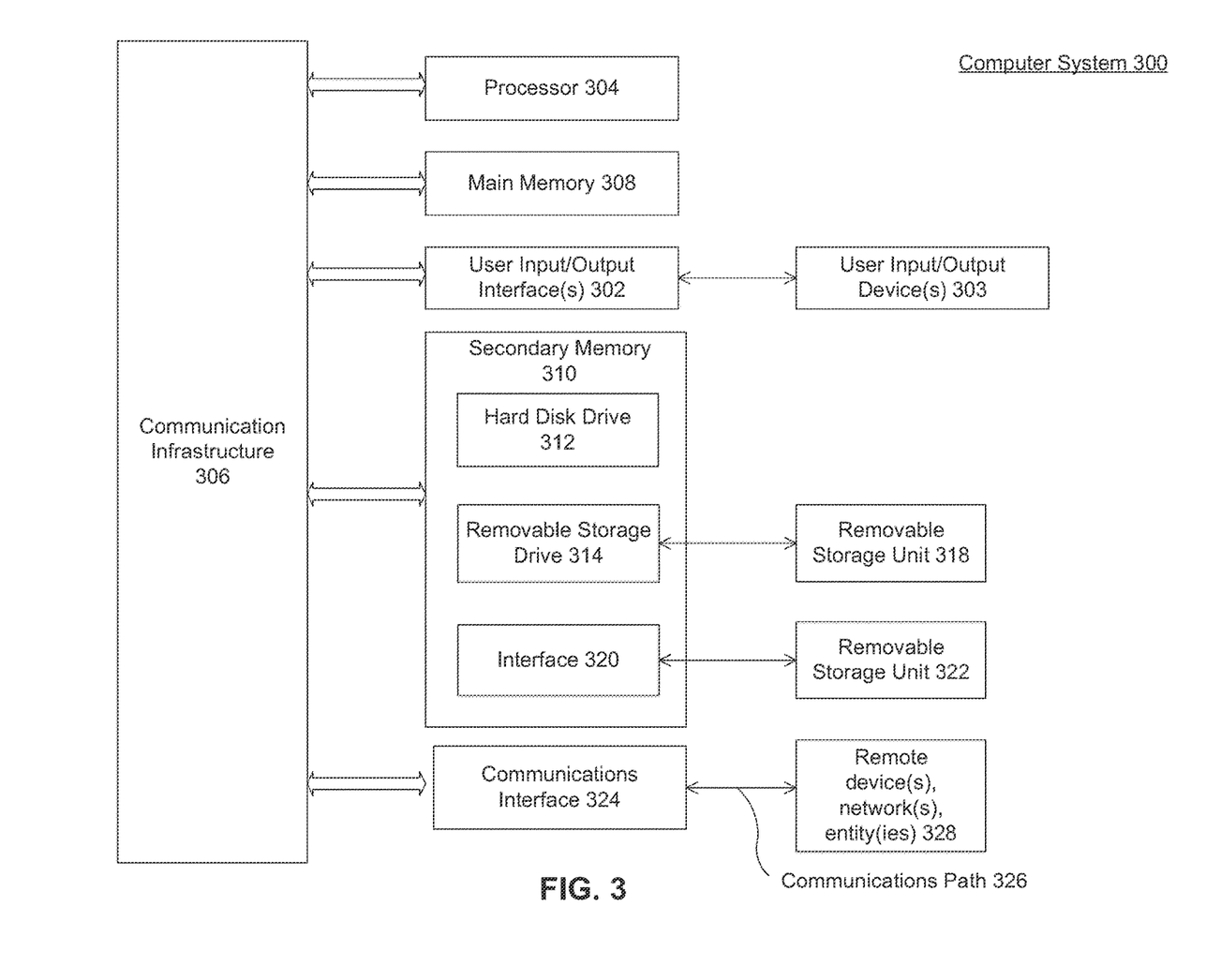
FIG. 3 depicts an example computer system useful for implementing various embodiments.

FIG. 3 depicts an example computer system 300 useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method, comprising:

extracting, by at least one processor, a data packet from an event or interaction occurring in an application, wherein the data packet comprises one or more values, each value with a respective label;

classifying, by the at least one processor, each value from the one or more values into a respective sensitivity based on the respective label and a classification configuration, the respective sensitivity selected from a group comprising high sensitivity, medium sensitivity, low sensitivity, and not sensitive, wherein the classification configuration is a default configuration available at initialization of the application and has a plurality of rules for identifying and classifying information based on one or more text strings included within the data packet;

sanitizing, by the at least one processor, the data packet into a sanitized data packet based on the respective sensitivity for each value, the sanitizing including transforming the data packet into the sanitized data packet using at least one of a plurality of transformation algorithms selected based on the respective sensitivity for each value, the sanitizing including:

pruning, by the at least one processor, each value with the respective sensitivity that is classified as high sensitivity;

redacting, by the at least one processor, each value with the respective sensitivity that is classified as medium sensitivity; and encrypting, by the at least one processor, each value with the respective sensitivity that is classified as low sensitivity; and logging, by the at least one processor, the sanitized data packet into a data repository.

2. The method of claim 1, wherein the plurality of rules each have a respective sensitivity level; and
classifying each value from the one or more values into the respective sensitivity based on the respective label comprises:
comparing, by the at least one processor, the respective label to the plurality of rules;
in response to the respective label satisfying a rule from the plurality of rules, assigning, by the at least one processor, the respective sensitivity level for the rule as the respective sensitivity for the value; and
in response to the respective label failing to satisfy the plurality of rules, assigning, by the at least one processor, the respective sensitivity for the value as not sensitive.

3. The method of claim 1, further comprising:
checking, by the at least one processor, if an update to the classification configuration is available;
in response to determining that the update is available, applying, by the at least one processor, the update to the classification configuration.

4. The method of claim 1, further comprising:
monitoring, by the at least one processor, an error occurring during the interaction or the event;
determining a cause of the error based on the sanitized data packet; and
resolving the error based on the cause.

5. The method of claim 1, further comprising:
monitoring, by the at least one processor, an error occurring during the interaction or the event;
in response to failing to determine a cause of the error based on the sanitized data packet, modifying, by the at least one processor, the classification configuration to a different classification configuration;
instructing a user to operate the application to cause the interaction or the event to occur again in the application;
classifying, by the at least one processor, at least one value from the one or more values in the data packet to a different sensitivity level based on the respective label;
sanitizing, by the at least one processor, the data packet into an additional sanitized data packet by pruning, redacting, or encrypting the at least one value;
logging, by the at least one processor, the additional sanitized data packet into the data repository;
determining a cause of the error based on the additional sanitized data packet; and
resolving the error based on the cause.

6. The method of claim 5, wherein the plurality of rules are each assigned a respective sensitivity level; and
updating the classification configuration to the different classification configuration comprises lowering the respective sensitivity level for at least one classification rule.

7. The method of claim 5, further comprising in response to resolving the error based on the cause, restoring, by the at least one processor, the different classification configuration back to the classification configuration.

8. The method of claim 1, wherein the pruning includes removing or deleting the value from the extracted data packet, and
wherein the redacting includes replacing an original value in the extracted data packet with a different value that is not based on the original value.

9. A system, comprising:
one or more processors;
memory communicatively coupled to the one or more processors, the memory storing instructions which, when executed by the one or more processors, cause the one or more processors to:
extract a data packet from an interaction or event occurring in an application, wherein the data packet comprises one or more values, each value with a respective label;
classify each value from the one or more values into a respective sensitivity based on the respective label and a classification configuration, the respective sensitivity selected from a group comprising high sensitivity, medium sensitivity, low sensitivity, and not sensitive, wherein the classification configuration is a default configuration available at initialization of the application and has a plurality of rules for identifying and classifying information based on one or more text strings included within the data packet;
sanitize the data packet into a sanitized data packet based on the respective sensitivity for each value, the sanitizing including transforming the data packet into the sanitized data packet using at least one of a plurality of transformation algorithms selected based on the respective sensitivity for each value, the sanitizing including:
pruning, by the one or more processors, each value with the respective sensitivity that is classified as high sensitivity;
redacting, by the one or more processors, each value with the respective sensitivity that is classified as medium sensitivity; and
encrypting, by the one or more processors, each value with the respective sensitivity that is classified as low sensitivity; and
log the sanitized data packet into a data repository.

10. The system of claim 9, wherein:
the plurality of rules each have a respective sensitivity level; and
the instructions further cause the one or more processors to classify each value from the one or more values into the respective sensitivity based on the respective label by:
comparing the respective label to the plurality of rules;
in response to the respective label satisfying a rule from the plurality of rules, assigning the respective sensitivity level for the rule as the respective sensitivity for the value; and
in response to the respective label failing to satisfy the plurality of rules, assigning the respective sensitivity for the value as not sensitive.

11. The system of claim 9, the instructions further cause the one or more processors to:
check if an update to the classification configuration is available;
in response to determining that the update is available, apply the update to the classification configuration.

12. The system of claim 9, the instructions further cause the one or more processors to:
monitor an error occurring during the interaction or the event;
determine a cause of the error based on the sanitized data packet; and
resolve the error based on the cause.

13. The system of claim 9, the instructions further cause the one or more processors to:
monitor an error occurring during the interaction or the event;

in response to failing to determine a cause of the error based on the sanitized data packet, modify the classification configuration to a different classification configuration;

instruct a user to operate the application to cause the interaction or the event to occur again in the application;

classify at least one value from the one or more values in the data packet to a different sensitivity level based on the respective label;

sanitize the data packet into an additional sanitized data packet by pruning, redacting, or encrypting the at least one value;

log the additional sanitized data packet into the data repository;

determine a cause of the error based on the additional sanitized data packet; and resolve the error based on the cause.

14. The system of claim 13, wherein:
the plurality of rules are each assigned a respective sensitivity level; and
the instructions further cause the one or more processors to update the classification configuration to the different classification configuration by lowering the respective sensitivity level for at least one classification rule.

15. The system of claim 13, wherein the instructions further cause the one or more processors to, in response to resolving the error based on the cause, restore the different classification configuration back to the classification configuration.

16. The system of claim 9, wherein the pruning includes removing or deleting the value from the extracted data packet, and
wherein the redacting includes replacing an original value in the extracted data packet with a different value that is not based on the original value.

17. A non-transitory computer readable storage medium having computer readable code thereon, the non-transitory computer readable storage medium including instructions configured to cause a computer system to perform operations, comprising:
extracting a data packet from an interaction or event occurring in an application, wherein the data packet comprises one or more values, each value with a respective label;
classifying each value from the one or more values into a respective sensitivity based on the respective label and a classification configuration, the respective sensitivity selected from a group comprising high sensitivity, medium sensitivity, low sensitivity, and not sensitive, wherein the classification configuration is a default configuration available at initialization of the application and has a plurality of rules for identifying and classifying information based on one or more text strings included within the data packet;
sanitizing the data packet into a sanitized data packet based on the respective sensitivity for each value, the sanitizing including transforming the data packet into the sanitized data packet using at least one of a plurality of transformation algorithms selected based on the respective sensitivity for each value, the sanitizing including:
pruning each value with the respective sensitivity that is classified as high sensitivity;
redacting each value with the respective sensitivity that is classified as medium sensitivity; and
encrypting each value with the respective sensitivity that is classified as low sensitivity; and
logging the sanitized data packet into a data repository.

18. The non-transitory computer readable storage medium of claim 17, wherein the plurality of rules each have a respective sensitivity level; and
the operations for classifying each value from the one or more values into the respective sensitivity based on the respective label further comprise:
comparing the respective label to the plurality of rules;
in response to the respective label satisfying a rule from the plurality of rules, assigning the respective sensitivity level for the rule as the respective sensitivity for the value; and
in response to the respective label failing to satisfy the plurality of rules, assigning the respective sensitivity for the value as not sensitive.

19. The non-transitory computer readable storage medium of claim 17, wherein the operations further comprise:
checking if an update to the classification configuration is available;
in response to determining that the update is available, applying the update to the classification configuration.

20. The non-transitory computer readable storage medium of claim 17, wherein the pruning includes removing or deleting the value from the extracted data packet, and
wherein the redacting includes replacing an original value in the extracted data packet with a different value that is not based on the original value.

* * * * *